United States Patent
Hofmann et al.

(10) Patent No.: US 11,130,842 B2
(45) Date of Patent: *Sep. 28, 2021

(54) PROCESS FOR THE PREPARATION OF POLYETHER POLYOLS

(71) Applicant: COVESTRO DEUTSCHLAND AG, Leverkusen (DE)

(72) Inventors: Jörg Hofmann, Krefeld (DE); Bert Klesczewski, Cologne (DE); Michael Schneider, Odenthal (DE)

(73) Assignee: Covestro Deutschland AG, Leverkusen (DE)

( * ) Notice: Subject to any disclaimer, the term of this patent is extended or adjusted under 35 U.S.C. 154(b) by 167 days.

This patent is subject to a terminal disclaimer.

(21) Appl. No.: 16/112,924

(22) Filed: Aug. 27, 2018

(65) Prior Publication Data

US 2019/0002634 A1 Jan. 3, 2019

Related U.S. Application Data

(62) Division of application No. 14/122,723, filed as application No. PCT/EP2012/060102 on May 30, 2012, now abandoned.

(30) Foreign Application Priority Data

Jun. 1, 2011 (EP) .................................. 11168433

(51) Int. Cl.
| | |
|---|---|
| *C08G 18/48* | (2006.01) |
| *C08G 64/18* | (2006.01) |
| *C08G 64/34* | (2006.01) |
| *C08G 65/26* | (2006.01) |
| *C08G 65/331* | (2006.01) |
| *C08G 71/04* | (2006.01) |

(52) U.S. Cl.
CPC ....... *C08G 65/331* (2013.01); *C08G 18/4866* (2013.01); *C08G 18/4887* (2013.01); *C08G 64/183* (2013.01); *C08G 64/34* (2013.01); *C08G 65/2663* (2013.01); *C08G 65/2696* (2013.01); *C08G 71/04* (2013.01); *C08G 2110/005* (2021.01); *C08G 2110/0008* (2021.01); *C08G 2110/0083* (2021.01)

(58) Field of Classification Search
CPC ...... C08G 64/32; C08G 64/34; C08G 64/183; C08G 65/2663; C08G 64/20
See application file for complete search history.

(56) References Cited

U.S. PATENT DOCUMENTS

| | | | |
|---|---|---|---|
| 3,404,109 A | 10/1968 | Milgrom | |
| 3,829,505 A | 8/1974 | Herold | |
| 3,941,849 A | 3/1976 | Herold | |
| 4,248,930 A | 2/1981 | Haas et al. | |
| 4,263,408 A | 4/1981 | Meyborg et al. | |
| 4,644,017 A | 2/1987 | Haas et al. | |
| 5,158,922 A | 10/1992 | Hinney et al. | |
| 5,470,813 A | 11/1995 | Le-Khac | |
| 5,536,883 A | 7/1996 | Le-Khac | |
| 5,637,673 A | 6/1997 | Le-Khac | |
| 5,714,428 A | 2/1998 | Le-Khac | |
| 5,789,626 A | 8/1998 | Le-Khac | |
| 6,018,017 A | 1/2000 | Le-Khac | |
| 6,617,419 B1 * | 9/2003 | Hofmann | ........... C08G 18/4866 528/425 |
| 6,762,278 B2 | 7/2004 | Hinz et al. | |
| 6,780,813 B1 | 8/2004 | Hofmann et al. | |
| 6,835,687 B2 | 12/2004 | Hofmann et al. | |
| 7,008,900 B1 | 3/2006 | Hofmann et al. | |
| 8,933,192 B2 | 1/2015 | Gurtler et al. | |
| 10,174,151 B2 * | 1/2019 | Hofmann | ........... C08G 18/4018 |
| 2003/0204042 A1 | 10/2003 | Moethrath et al. | |
| 2006/0223973 A1 | 10/2006 | Hinz et al. | |
| 2008/0021154 A1 | 1/2008 | Haider et al. | |
| 2009/0306239 A1 | 12/2009 | Mijolovic et al. | |
| 2010/0048935 A1 | 2/2010 | Mijolovic et al. | |
| 2011/0230581 A1 * | 9/2011 | Klescewski | ........ C08G 65/2696 521/174 |
| 2013/0072602 A1 | 3/2013 | Gurtler et al. | |
| 2013/0296450 A1 | 11/2013 | Hofmann | |
| 2015/0299374 A1 | 10/2015 | Hofmann | |

FOREIGN PATENT DOCUMENTS

| | | |
|---|---|---|
| CA | 1337448 C | 10/1995 |
| JP | 4145123 B2 | 5/1992 |

\* cited by examiner

*Primary Examiner* — Melissa A Rioja
(74) *Attorney, Agent, or Firm* — Donald R. Palladino; N. Denise Brown

(57) ABSTRACT

The invention relates to a method for producing polyether carbonate polyols, wherein (i) in a first step a polyether carbonate polyol is produced from one or more H-functional starter substances, one or more alkylene oxides, and carbon dioxide in the presence of at least one DMC catalyst, and (ii) in a second step the polyether carbonate polyol is chain-extended with a mixture of at least two different alkylene oxides in the presence of at least one DMC catalyst. The invention further relates to polyether carbonate polyols that contain a terminal mixed block of at least two alkylene oxides and to a method for producing soft polyurethane foams, wherein a polyol component containing a polyether carbonate polyol according to the invention is used.

12 Claims, No Drawings

PROCESS FOR THE PREPARATION OF POLYETHER POLYOLS

CROSS-REFERENCE TO RELATED APPLICATIONS

This Application is a divisional application of U.S. application Ser. No. 14/122,723 filed on Nov. 27, 2013, which is a national stage application under 35 U.S.C. § 371 of PCT/EP2012/060102 filed May 30, 2012, which claims the benefit of European Application No. 11168433.8 filed Jun. 1, 2011, each of which are incorporated by reference herein.

FIELD

The present invention relates to a process for the preparation of polyethercarbonate polyols from one or more H-functional starter substances, one or more alkylene oxides and carbon dioxide in the presence of at least one double metal cyanide catalyst, the polyethercarbonate polyols having a mixed block of at least two alkylene oxides at the end of the chain, and to flexible polyurethane foams obtainable therefrom.

BACKGROUND

The preparation of polyethercarbonate polyols by the catalytic reaction of alkylene oxides (epoxides) and carbon dioxide in the presence or absence of H-functional starter substances (starters) has been studied intensively for more than 40 years (e.g. Inoue et al., Copolymerization of Carbon Dioxide and Epoxide with Organometallic Compounds; Die Makromolekulare Chemie 130, 210-220, 1969). This reaction, e.g. using an H-functional starter compound, is shown diagrammatically in Scheme (I), where R is an organic radical such as alkyl, alkylaryl or aryl, each of which can also comprise heteroatoms such as O, S, Si, etc., and e and f are integers, and where the product shown here in Scheme (I) for the polyethercarbonate polyol is only to be understood as meaning that blocks with the indicated structure can in principle be found in the polyethercarbonate polyol obtained, but that the sequence, number and length of the blocks and the OH functionality of the starter can vary and are not limited to the polyethercarbonate polyol shown in Scheme (I). This reaction (cf. Scheme (I)) is ecologically very advantageous because it represents the conversion of a greenhouse gas like $CO_2$ to a polymer. The cyclic carbonate shown in Scheme (I) (e.g. propylene carbonate for R=$CH_3$) is formed as a further product (actually a by-product).

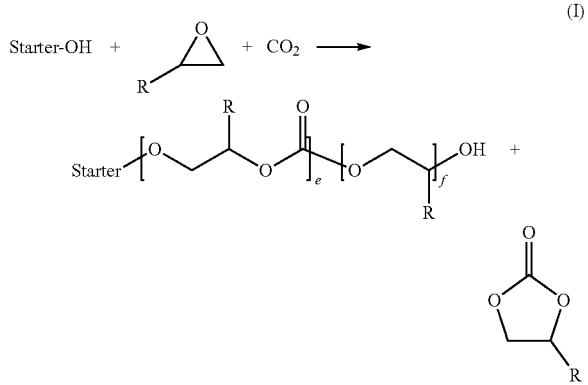

Activation in terms of the invention is a step in which a fraction of the alkylene oxide compound, optionally in the presence of $CO_2$, is added to the DMC catalyst and the addition of the alkylene oxide compound is then interrupted; an evolution of heat, which can lead to a hotspot, is observed due to a subsequent exothermic chemical reaction, and a pressure drop in the reactor is observed due to the conversion of alkylene oxide and optionally $CO_2$. The process step of activation is the period of time from the addition of the fraction of alkylene oxide compound to the DMC catalyst, optionally in the presence of $CO_2$, up to the start of the evolution of heat. In general, the activation step can be preceded by a step for drying of the DMC catalyst and optionally the starter at elevated temperature and/or reduced pressure, this drying step not being part of the activation step in terms of the present invention.

The formation of copolymers from epoxides (e.g. propylene oxide) and carbon dioxide has been known for a long time. Thus, for example, U.S. Pat. No. 4,500,704 describes the copolymerization of carbon dioxide and propylene oxide using DMC catalysts. In this case, for example, with a starter substance and 12.3 g (212 mmol) of propylene oxide in a reactor under a carbon dioxide pressure of 48 bar, 71% of the propylene oxide was converted after 48 hours at 35° C. Of the 150.5 mmol of propylene oxide converted, 27 mmol (18%) reacted to give propylene carbonate, a generally unwanted by-product.

WO-A 2008/058913 discloses a process for the preparation of polyethercarbonate polyols having a block of pure alkylene oxide units, especially a block of pure propylene oxide units, at the end of the chain. However, WO-A 2008/058913 does not disclose polyethercarbonate polyols having a mixed block of at least two alkylene oxides at the end of the chain.

SUMMARY OF THE INVENTION

The object of the present invention was to provide polyethercarbonate polyols that produce flexible polyurethane foams with an increased compressive strength and an increased tensile strength. In practice, a flexible polyurethane foam quality improved in this way has the technical advantage that said foams have an increased mechanical load-bearing capacity.

It has now been found, surprisingly, that flexible polyurethane foams with an increased compressive strength and an increased tensile strength result from polyethercarbonate polyols having a mixed block of at least two alkylene oxides at the end of the chain ("terminal mixed block"). The present invention thus provides a process for the preparation of polyethercarbonate polyols which is characterized in that
  (i) in a first step a polyethercarbonate polyol is prepared from one or more H-functional starter substances, one or more alkylene oxides and carbon dioxide in the presence of at least one DMC catalyst, and
  (ii) in a second step the polyethercarbonate polyol chain is extended with a mixture of at least two different alkylene oxides in the presence of at least one DMC catalyst, and in that the mixture of at least two different alkylene oxides used in the second step (ii) is a mixture comprising propylene oxide (PO) and ethylene oxide (EO) in a molar ratio PO/EO of 15/85 to 60/40.

The present invention also provides a process for the production of flexible polyurethane foams wherein the starting material used is a polyol component (component A)

comprising a polyethercarbonate polyol obtainable by a process which is characterized in that
  (i) in a first step a polyethercarbonate polyol is prepared from one or more H-functional starter substances, one or more alkylene oxides and carbon dioxide in the presence of at least one DMC catalyst, and
  (ii) in a second step the polyethercarbonate polyol chain is extended with a mixture of at least two different alkylene oxides in the presence of at least one DMC catalyst,
and in that the mixture of at least two different alkylene oxides used in the second step (ii) is a mixture comprising propylene oxide (PO) and ethylene oxide (EO) in a molar ratio PO/EO of 15/85 to 60/40.

The flexible polyurethane foams according to the invention preferably have a gross density according to DIN EN ISO 3386-1-98 in the range from ≥10 kg/m$^3$ to ≤150 kg/m$^3$, preferably from ≥20 kg/m$^3$ to ≤70 kg/m$^3$, and a compressive strength according to DIN EN ISO 3386-1-98 in the range from ≥0.5 kPa to ≤20 kPa (at 40% deformation after 4$^{th}$ cycle).

DETAILED DESCRIPTION

Step (i):

The preparation of the polyethercarbonate polyol according to step (i) is preferably carried out by adding one or more alkylene oxides and carbon dioxide, in the presence of at least one DMC catalyst, on to one or more H-functional starter substances ("copolymerization").

For example, the process for the preparation of polyethercarbonate polyol according to step (i) is characterized in that (α) the H-functional starter substance or a mixture of at least two H-functional starter substances is taken and optionally water and/or other highly volatile compounds are removed by raising the temperature and/or reducing the pressure ("drying"), the DMC catalyst being added to the H-functional starter substance or the mixture of at least two H-functional starter substances before or after drying, (β) for activation, a fraction (based on the total amount of alkylene oxides used in the activation and copolymerization) of one or more alkylene oxides is added to the mixture resulting from step (α), it optionally being possible for this addition of an alkylene oxide fraction to take place in the presence of $CO_2$, the hotspot that occurs due to the subsequent exothermic chemical reaction and/or a pressure drop in the reactor then being allowed to subside, and it also being possible for the activation step (β) to be carried out several times, and (γ) one or more alkylene oxides and carbon dioxide are added to the mixture resulting from step (β), it being possible for the alkylene oxides used in step (γ) to be identical to or different from the alkylene oxides used in step (β).

In general, alkylene oxides (epoxides) having 2-24 carbon atoms can be used for the process according to the invention. Examples of alkylene oxides having 2-24 carbon atoms are one or more compounds selected from the group comprising ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, glycidol derivatives such as methyl glycidyl ether, ethyl glycidyl ether, 2-ethylhexyl glycidyl ether, allyl glycidyl ether and glycidyl methacrylate, and epoxy-functional alkoxysilanes such as 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane and 3-glycidyloxypropyltriisopropoxysilane. The alkylene oxides used in step (i) are preferably ethylene oxide and/or propylene oxide, especially propylene oxide.

Suitable H-functional starter substances which can be used are compounds with H atoms that are active for alkoxylation. Examples of groups with H atoms that are active for alkoxylation are —OH, —NH$_2$ (primary amines), —NH— (secondary amines), —SH and —CO$_2$H; —OH and —NH$_2$ are preferred and —OH is particularly preferred. Examples of H-functional starter substances used are one or more compounds selected from the group comprising monohydric or polyhydric alcohols, polybasic amines, polyhydric thiols, amino alcohols, thio alcohols, hydroxy esters, polyether polyols, polyester polyols, polyesterether polyols, polyethercarbonate polyols, polycarbonate polyols, polycarbonates, polyethyleneimines, polyetheramines (e.g. so-called Jeffamine® from Huntsman, such as D-230, D-400, D-2000, T-403, T-3000 or T-5000, or corresponding products from BASF, such as polyetheramine D230, D400, D200, T403 or T5000), polytetrahydrofurans (e.g. PolyTHF® from BASF, such as PolyTHF® 250, 650S, 1000, 1000S, 1400, 1800 or 2000), polytetrahydrofuranamines (BASF product polytetrahydrofuranamine 1700), polyetherthiols, polyacrylate polyols, castor oil, ricinoleic acid mono- or diglyceride, fatty acid monoglycerides, chemically modified fatty acid mono-, di- and/or triglycerides, and fatty acid $C_1$-$C_{24}$-alkyl esters comprising an average of at least 2 OH groups per molecule. Examples of fatty acid $C_1$-$C_{24}$-alkyl esters comprising an average of at least 2 OH groups per molecule are commercially available products such as Lupranol Balance® (BASF AG), various types of Merginol® (Hobum Oleochemicals GmbH), various types of Sovermol® (Cognis Deutschland GmbH & Co. KG) and various types of Soyol® ™ (USSC Co.).

Monofunctional starter compounds which can be used are alcohols, amines, thiols and carboxylic acids. The following monofunctional alcohols can be used: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. The following monofunctional amines are suitable: butylamine, tert-butylamine, pentylamine, hexylamine, aniline, aziridine, pyrrolidine, piperidine, morpholine. The following monofunctional thiols can be used: ethanethiol, 1-propanethiol, 2-propanethiol, 1-butanethiol, 3-methyl-1-butanethiol, 2-butene-1-thiol, thiophenol. The following monofunctional carboxylic acids may be mentioned: formic acid, acetic acid, propionic acid, butyric acid, fatty acids such as stearic acid, palmitic acid, oleic acid, linoleic acid and linolenic acid, benzoic acid, acrylic acid.

Examples of polyhydric alcohols suitable as H-functional starter substances are dihydric alcohols (e.g. ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (e.g. 3-methyl-1,5-pentanediol), 1,6-hexanediol, 1,8-octanediol, 1,10-decanediol, 1,12-dodecanediol, bis-(hydroxymethyl)cyclohexanes (e.g. 1,4-bis(hydroxymethyl)cyclohexane), triethylene glycol, tetraethylene glycol, polyethylene glycols, dipropylene glycol, tripropylene glycol, polypropylene glycols, dibutylene glycol, polybutylene glycols); trihydric alcohols (e.g. trimethylolpropane, glycerol, trishydroxyethyl isocyanurate, castor oil); tetrahydric alcohols (e.g. pentaerythritol); polyalcohols (e.g. sorbitol, hexitol, sucrose, starch, starch hydrolysates, cellulose, cellulose hydrolysates, hydroxy-functionalized fats and oils, especially castor oil); and any modified products of the aforesaid alcohols comprising different amounts of ε-caprolactone.

The H-functional starter substances can also be selected from the class of substances comprising the polyether polyols, especially those with a molecular weight $M_n$ ranging from 100 to 4000 g/mol. Preferred polyether polyols are those made up of repeating ethylene oxide and propylene oxide units, preferably with a proportion of 35 to 100% of propylene oxide units and particularly preferably with a proportion of 50 to 100% of propylene oxide units. They can be random copolymers, gradient copolymers or alternating or block copolymers of ethylene oxide and propylene oxide. Examples of suitable polyether polyols made up of repeating propylene oxide and/or ethylene oxide units are the Desmophen®, Acclaim®, Arcol®, Baycoll®, Bayfill®, Bayflex®, Baygal®, PET® and Polyether® Polyols from Bayer MaterialScience AG (e.g. Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Examples of other suitable homopolyethylene oxides are the Pluriol® E brands from BASF SE, examples of suitable homo-polypropylene oxides are the Pluriol® P brands from BASF SE, and examples of suitable mixed copolymers of ethylene oxide and propylene oxide are the Pluronic® PE or Pluriol® RPE brands from BASF SE.

The H-functional starter substances can also be selected from the class of substances comprising the polyester polyols, especially those with a molecular weight $M_n$ ranging from 200 to 4500 g/mol. The polyester polyols used are at least difunctional polyesters and preferably consist of alternating acid and alcohol units. Examples of acid components used are succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of said acids and/or anhydrides. Examples of alcohol components used are ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol or mixtures of said alcohols. If dihydric or polyhydric polyether polyols are used as the alcohol component, polyesterether polyols are obtained which can also be used as starter substances for preparing the polyethercarbonate polyols. It is preferable to use polyether polyols of $M_n$=150 to 2000 g/mol to prepare the polyesterether polyols.

Other H-functional starter substances which can be used are polycarbonate polyols (e.g. polycarbonate diols), especially those with a molecular weight $M_n$ ranging from 150 to 4500 g/mol, preferably from 500 to 2500 g/mol, which are prepared e.g. by reacting phosgene, dimethyl carbonate, diethyl carbonate or diphenyl carbonate with di- and/or polyfunctional alcohols, polyester polyols or polyether polyols. Examples of polycarbonate polyols can be found e.g. in EP-A 1359177. Examples of polycarbonate diols which can be used are various types of Desmophen® C from Bayer MaterialScience AG, such as Desmophen® C 1100 or Desmophen® C 2200.

In another embodiment of the invention, polyethercarbonate polyols can be used as H-functional starter substances. The polyethercarbonate polyols obtainable by the process according to the invention described here, after step (i), step (ii) or step (iii), are used in particular. These polyethercarbonate polyols used as H-functional starter substances are previously prepared for this purpose in a separate reaction step.

The H-functional starter substances generally have a functionality (i.e. number of H atoms per molecule that are active for polymerization) of 1 to 8, preferably of 2 or 3. The H-functional starter substances are used either individually or as a mixture of at least two H-functional starter substances.

Preferred H-functional starter substances are alcohols of general formula (II):

$$\text{HO}-(\text{CH}_2)_x-\text{OH} \qquad (II)$$

where x is a number from 1 to 20, preferably an even number from 2 to 20. Examples of alcohols of formula (II) are ethylene glycol, 1,4-butanediol, 1,6-hexanediol, 1,8-octanediol, 1,10-decanediol and 1,12-dodecanediol. Other preferred H-functional starter substances are neopentyl glycol, trimethylolpropane, glycerol, pentaerythritol, and reaction products of the alcohols of formula (II) with ε-caprolactone, e.g. reaction products of trimethylolpropane with ε-caprolactone, reaction products of glycerol with ε-caprolactone and reaction products of pentaerythritol with ε-caprolactone. Other H-functional starter substances which are preferably used are water, diethylene glycol, dipropylene glycol, castor oil, sorbitol, and polyether polyols made up of repeating polyalkylene oxide units.

Particularly preferably, the H-functional starter substances are one or more compounds selected from the group comprising ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane and di- and trifunctional polyether polyols, the polyether polyol being made up of a di- or tri-H-functional starter substance and propylene oxide or a di- or tri-H-functional starter substance, propylene oxide and ethylene oxide. The polyether polyols preferably have a molecular weight $M_n$ ranging from 62 to 4500 g/mol and a functionality of 2 to 3, especially a molecular weight $M_n$ ranging from 62 to 3000 g/mol a functionality of 2 to 3.

The polyethercarbonate polyols are prepared by the catalytic addition of carbon dioxide and alkylene oxides on to H-functional starter substances. In terms of the invention, "H-functional" is understood as meaning the number of H atoms per molecule of starter compound that are active for alkoxylation.

DMC catalysts for use in the homopolymerization of epoxides are known in principle from the state of the art (cf., for example, U.S. Pat. Nos. 3,404,109, 3,829,505, 3,941,849 and 5,158,922). DMC catalysts described e.g. in U.S. Pat. No. 5,470,813, EP-A 700 949, EP-A 743 093, EP-A 761 708, WO 97/40086, WO 98/16310 and WO 00/47649 have a very high activity in the homopolymerization of epoxides and enable polyether polyols to be prepared with very low catalyst concentrations (25 ppm or less), so it is generally no longer necessary to separate the catalyst from the finished product. Typical examples are the highly active DMC catalysts described in EP-A 700 949, which, in addition to a double metal cyanide compound (e.g. zinc hexacyanocobaltate(III)) and an organic complexing ligand (e.g. tert-butanol), also comprise a polyether with a number-average molecular weight greater than 500 g/mol.

The DMC catalysts are obtained by a process in which
(a) in the first step, an aqueous solution of a metal salt is reacted with an aqueous solution of a metal cyanide salt in the presence of one or more organic complexing ligands, e.g. an ether or alcohol,
(b) in the second step, the solid is separated from the suspension obtained in (i) by known techniques (such as centrifugation or filtration),
(c) optionally, in a third step, the isolated solid is washed with an aqueous solution of an organic complexing ligand (e.g. by resuspension and then re-isolation by filtration or centrifugation), and
(d) the solid obtained is then dried, optionally after pulverization, at temperatures generally of 20-120° C. and at pressures generally of 0.1 mbar to normal pressure (1013 mbar), one or more organic complexing ligands, preferably in excess (based on the double metal cyanide compound), and optionally other complexing components, being added in the first step or immediately after the precipitation of the double metal cyanide compound (second step).

The double metal cyanide compounds comprised in the DMC catalysts are the reaction products of water-soluble metal salts and water-soluble metal cyanide salts.

For example, an aqueous solution of zinc chloride (preferably in excess, based on the metal cyanide salt, e.g. potassium hexacyanocobaltate) and potassium hexacyanocobaltate are mixed and dimethoxyethane (glyme) or tert-butanol (preferably in excess, based on zinc hexacyanocobaltate) is then added to the suspension formed.

Metal salts suitable for preparing the double metal cyanide compounds preferably have general formula (III):

$$M(X)_n \quad (III)$$

where
M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, M preferably being $Zn^{2+}$, $Fe^{2+}$, $Co^{2+}$ or $Ni^{2+}$;
X are one or more (i.e. different) anions, preferably an anion selected from the group comprising halides (i.e. fluoride, chloride, bromide, iodide), hydroxide, sulfate, carbonate, cyanate, thiocyanate, isocyanate, isothiocyanate, carboxylate, oxalate and nitrate;
n is 1 when X=sulfate, carbonate or oxalate; and
n is 2 when X=halide, hydroxide, carboxylate, cyanate, thiocyanate, isocyanate, isothiocyanate or nitrate,
or suitable metal salts have general formula (IV):

$$M_r(X)_3 \quad (IV)$$

where
M is selected from the metal cations $Fe^{3+}$, $Al^{3+}$, $Co^{3+}$ and $Cr^{3+}$;
X are one or more (i.e. different) anions, preferably an anion selected from the group comprising halides (i.e. fluoride, chloride, bromide, iodide), hydroxide, sulfate, carbonate, cyanate, thiocyanate, isocyanate, isothiocyanate, carboxylate, oxalate and nitrate;
r is 2 when X=sulfate, carbonate or oxalate; and
r is 1 when X=halide, hydroxide, carboxylate, cyanate, thiocyanate, isocyanate, isothiocyanate or nitrate,
or suitable metal salts have general formula (V):

$$M(X)_s \quad (V)$$

where
M is selected from the metal cations $Mo^{4+}$, $V^{4+}$ and $W^{4+}$;
X are one or more (i.e. different) anions, preferably an anion selected from the group comprising halides (i.e. fluoride, chloride, bromide, iodide), hydroxide, sulfate, carbonate, cyanate, thiocyanate, isocyanate, isothiocyanate, carboxylate, oxalate and nitrate;
s is 2 when X=sulfate, carbonate or oxalate; and
s is 4 when X=halide, hydroxide, carboxylate, cyanate, thiocyanate, isocyanate, isothiocyanate or nitrate,
or suitable metal salts have general formula (VI):

$$M(X)_t \quad (VI)$$

where
M is selected from the metal cations $Mo^{6+}$ and $W^{6+}$;
X are one or more (i.e. different) anions, preferably an anion selected from the group comprising halides (i.e. fluoride, chloride, bromide, iodide), hydroxide, sulfate, carbonate, cyanate, thiocyanate, isocyanate, isothiocyanate, carboxylate, oxalate and nitrate;
t is 3 when X=sulfate, carbonate or oxalate; and
t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparing the double metal cyanide compounds preferably have general formula (VII):

$$(Y)_a M'(CN)_b (A)_c \quad (VII)$$

where
M' is selected from one or more metal cations from the group comprising Fe(II), Fe(III), Co(II), Co(III), Cr(II), Cr(III), Mn(II), Mn(III), Ir(III), Ni(II), Rh(III), Ru(II), V(IV) and V(V), M' preferably being one or more metal cations from the group comprising Co(II), Co(III), Fe(II), Fe(III), Cr(III), Ir(III) and Ni(II);
Y is selected from one or more metal cations from the group comprising alkali metals (i.e. $L^+$, $Na^+$, $K^+$, $Rb^+$) and alkaline earth metals (i.e. $Be^{2+}$, $Mg^{2+}$, $Ca^{2+}$, $Sr^{2+}$, $Ba^{2+}$);
A is selected from one or more anions from the group comprising halides (i.e. fluoride, chloride, bromide, iodide), hydroxide, sulfate, carbonate, cyanate, thiocyanate, isocyanate, isothiocyanate, carboxylate, azide, oxalate and nitrate; and
a, b and c are integers, the values of a, b and c being chosen so that the metal cyanide salt is electronically neutral; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III) and lithium hexacyanocobaltate(III).

Preferred double metal cyanide compounds comprised in the DMC catalysts are compounds of general formula (VIII):

$$M_x[M'_{x'}(CN)_y]_z \qquad \text{(VIII)}$$

where
M is as defined in formulae (III) to (VI);
M' is as defined in formula (VII); and
x, x', y and z are integers and are chosen so that the double metal cyanide compound is electronically neutral.

Preferably:
x=3, x'=1, y=6 and z=2;
M=Fe(II), Co(II) or Ni(II); and
M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Other examples of suitable double metal cyanide compounds can be found e.g. in U.S. Pat. No. 5,158,922 (column 8, lines 29-66). It is particularly preferable to use zinc hexacyanocobaltate(III).

The organic complexing ligands added in the preparation of the DMC catalysts are disclosed e.g. in U.S. Pat. No. 5,158,922 (cf. especially column 6, lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). For example, water-soluble organic compounds with heteroatoms, such as oxygen, nitrogen, phosphorus or sulfur, which can form complexes with the double metal cyanide compound are used as organic complexing ligands. Preferred organic complexing ligands are alcohols, aldehydes, ketones, ethers, esters, amides, ureas, nitriles, sulfides and mixtures thereof. Particularly preferred organic complexing ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), and compounds comprising both aliphatic or cycloaliphatic ether groups and aliphatic hydroxyl groups (e.g. ethylene glycol mono-tert-butyl ether, diethylene glycol mono-tert-butyl ether, tripropylene glycol monomethyl ether and 3-methyl-3-oxetanemethanol). Very particularly preferred organic complexing ligands are selected from one or more compounds from the group comprising dimethoxyethane, tert-butanol, 2-methyl-3-buten-2-ol, 2-methyl-3-butyn-2-ol, ethylene glycol mono-tert-butyl ether and 3-methyl-3-oxetanemethanol.

Optionally, one or more complexing components from the following classes of compounds are used in the preparation of the DMC catalysts: polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or glycidyl ethers, glycosides, carboxylic acid esters of polyhydric alcohols, gallic acids or their salts, esters or amides, cyclodextrins, phosphorus compounds, α,β-unsaturated carboxylic acid esters or ionic surface-active compounds.

Preferably, in the first step of the preparation of the DMC catalysts, the aqueous solution of the metal salt (e.g. zinc chloride), used in stoichiometric excess (at least 50 mol %, based on the metal cyanide salt, i.e. a molar ratio of metal salt to metal cyanide salt of at least 2.25 to 1.00) is reacted with the aqueous solution of the metal cyanide salt (e.g. potassium hexacyanocobaltate) in the presence of the organic complexing ligand (e.g. tert-butanol) to form a suspension comprising the double metal cyanide compound (e.g. zinc hexacyanocobaltate), water, excess metal salt and the organic complexing ligand.

The organic complexing ligand can be present in the aqueous solution of the metal salt and/or the aqueous solution of the metal cyanide salt, or it is added immediately to the suspension obtained after precipitation of the double metal cyanide compound. It has been found advantageous to mix the aqueous solutions of the metal salt and metal cyanide salt and the organic complexing ligand with vigorous agitation. Optionally, the suspension formed in the first step is then treated with another complexing component, the latter preferably being used in a mixture with water and organic complexing ligand. A preferred procedure for carrying out the first step (i.e. preparation of the suspension) involves the use of a mixing nozzle, particularly preferably a jet disperser as described in WO-A 01/39883.

In the second step, the isolation of the solid (i.e. the precursor of the catalyst according to the invention) from the suspension is effected by known techniques such as centrifugation or filtration.

In one preferred embodiment, the isolated solid is then washed, in a third process step, with an aqueous solution of the organic complexing ligand (e.g. by resuspension and then re-isolation by filtration or centrifugation). This makes it possible e.g. to remove water-soluble by-products, such as potassium chloride, from the catalyst. Preferably, the amount of organic complexing ligand in the aqueous wash solution is between 40 and 80 wt %, based on the total solution.

Optionally, another complexing component, preferably in the range between 0.5 and 5 wt %, based on the total solution, is added to the aqueous wash solution in the third step.

It is moreover advantageous to wash the isolated solid more than once. Preferably, a first washing step (c-1) is carried out with an aqueous solution of the unsaturated alcohol (e.g. by resuspension and then re-isolation by filtration or centrifugation) in order e.g. to remove water-soluble by-products, such as potassium chloride, from the catalyst according to the invention. Particularly preferably, the amount of unsaturated alcohol in the aqueous wash solution is between 40 and 80 wt %, based on the total solution of the first washing step. In the other washing steps (c-2), either the first washing step is repeated one or more times, preferably one to three times, or, preferably, a non-aqueous solution, e.g. a mixture or solution of unsaturated alcohol and another complexing component (preferably in the range between 0.5 and 5 wt %, based on the total amount of wash solution of step (c-2)), is used as the wash solution and the solid is washed therewith one or more times, preferably one to three times.

The isolated and optionally washed solid is then dried, optionally after pulverization, at temperatures generally of 20 to 100° C. and at pressures generally of 0.1 mbar to normal pressure (1013 mbar).

A preferred procedure for isolating the DMC catalysts according to the invention from the suspension, by filtration, filter cake washing and drying, is described in WO-A 01/80994.

Step (ii):

In step (ii) of a preferred embodiment of the invention, a mixture of ethylene oxide (EO) and propylene oxide (PO) is used as the mixture of at least two different alkylene oxides, the molar ratio PO/EO used in step (ii) being from 15/85 to 60/40, preferably from 15/85 to 40/60. Preferably, the polyethercarbonate polyols resulting from step (ii), comprising a terminal mixed block of EO and PO, have a proportion of primary OH groups of 10 to 90 mol %, particularly preferably of 20 to 50 mol %.

The mean length of the mixed blocks of at least two different alkylene oxides, prepared in step (ii), is preferably 2.0 to 20.0 alkylene oxide units, particularly preferably 2.5 to 10.0 alkylene oxide units, based in each case on one OH group of the polyethercarbonate polyol.

Preferably, the polyethercarbonate polyols resulting from step (ii), comprising a mixed block at least two alkylene oxides, have a hydroxyl number of 20 mg KOH/g to 80 mg KOH/g, particularly preferably of 25 mg KOH/g to 60 mg KOH/g.

Step (iii):

Optionally, the process according to the invention for the preparation of polyethercarbonate polyols can also comprise a third step, wherein (iii) the chain of the polyethercarbonate polyol with terminal mixed block, resulting from step (ii), is extended with an alkylene oxide, preferably with propylene oxide or ethylene oxide, particularly preferably with propylene oxide.

The mean length of a pure alkylene oxide block prepared in step (iii) is preferably 2 to 30 alkylene oxide units, particularly preferably 5 to 18 alkylene oxide units, based in each case on one OH group of the polyethercarbonate polyol. The reaction according to step (iii) can be carried out e.g. in the presence of DMC catalysts or else in the presence of acidic catalysts (such as BF3) or basic catalysts (such as KOH or CsOH). Preferably, the reaction according to step (iii) is carried out in the presence of a DMC catalyst.

Polyethercarbonate Polyols

The invention thus also provides polyethercarbonate polyols comprising a terminal mixed block of at least two alkylene oxides, preferably a terminal mixed block of ethylene oxide (EO) and propylene oxide (PO). Preferably, the molar ratio PO/EO is from 15/85 to 60/40, preferably from 15/85 to 40/60. In a preferred embodiment of the invention, the polyethercarbonate polyols comprising a terminal mixed block of EO and PO have a proportion of primary OH groups of 10 to 90 mol %, particularly preferably of 20 to 50 mol %. Preferably, the invention provides polyethercarbonate polyols comprising a terminal mixed block of at least two alkylene oxides, characterized in that the mean length of the terminal mixed block of at least two different alkylene oxides is from 2.0 to 20.0 alkylene oxide units, particularly preferably from 2.5 to 10.0 alkylene oxide units (based in each case on one OH group of the polyethercarbonate polyol). The polyethercarbonate polyols according to the invention comprising a mixed block of at least two alkylene oxides have a hydroxyl number preferably of 20 mg KOH/g to 80 mg KOH/g, particularly preferably of 25 mg KOH/g to 60 mg KOH/g.

Optionally, these polyethercarbonate polyols according to the invention can comprise a pure alkylene oxide block at the end of the chain, said block consisting preferably of propylene oxide or ethylene oxide units, particularly preferably of propylene oxide units. The mean length of such a pure alkylene oxide block at the end of the chain is preferably 2 to 30 alkylene oxide units, particularly preferably 5 to 18 alkylene oxide units, based in each case on one OH group of the polyethercarbonate polyol.

Flexible Polyurethane Foams

Preferably, the invention provides a process for the production of flexible polyurethane foams with a gross density according to DIN EN ISO 3386-1-98 in the range from $\geq 10$ kg/m$^3$ to $\leq 150$ kg/m$^3$, preferably from $\geq 20$ kg/m$^3$ to $\leq 70$ kg/m$^3$, and a compressive strength according to DIN EN ISO 3386-1-98 in the range from $\geq 0.5$ kPa to $\leq 20$ kPa (at 40% deformation after 4$^{th}$ cycle) by reacting component A (polyol formulation) comprising A1 100 to 10 parts by weight, preferably 100 to 50 parts by weight, particularly preferably 100 parts by weight (based on the sum of the parts by weight of components A1 and A2), of polyethercarbonate polyol having a mixed block of at least two alkylene oxides at the end of the chain, characterized in that the terminal mixed block comprises a mixture of propylene oxide (PO) and ethylene oxide (EO) in a molar ratio PO/EO of 15/85 to 60/40, A2 0 to 90 parts by weight, preferably 0 to 50 parts by weight (based on the sum of the parts by weight of components A1 and A2), of conventional polyether polyol, component A particularly preferably being free of conventional polyether polyol, A3 0.5 to 25 parts by weight, preferably 2 to 5 parts by weight (based on the sum of the parts by weight of components A1 and A2), of water and/or physical blowing agents, A4 0.05 to 10 parts by weight, preferably 0.2 to 4 parts by weight (based on the sum of the parts by weight of components A1 and A2), of auxiliary substances and additives such as a) catalysts,
b) surface-active additives and
c) pigments or flame retardants, and A5 0 to 10 parts by weight, preferably 0 to 5 parts by weight (based on the sum of the parts by weight of components A1 and A2), of compounds having isocyanate-reactive hydrogen atoms with a molecular weight of 62-399, with component B comprising polyisocyanates, the preparation taking place at an index of 50 to 250, preferably of 70 to 130, particularly preferably of 75 to 115, and all the parts by weight of components A1 to A5 in the present patent application being scaled so that the sum of the parts by weight of components A 1+A2 in the composition is 100.

Preferably, the polyethercarbonate polyol of component A1 is obtainable by the above-described preparative process according to the invention.

Component A1

The preparation of component A1 according to steps (i) and (ii) and according to optional step (iii) has already been illustrated above in connection with the process for preparing the polyethercarbonate polyols.

Component A2

The starting components of component A2 are conventional polyether polyols. In terms of the invention, conventional polyether polyols are understood as meaning compounds that are alkylene oxide addition products of starter compounds with Zerewitinoff-active hydrogen atoms, i.e. polyether polyols with a hydroxyl number according to DIN 53240 of $\geq 15$ mg KOH/g to $\leq 80$ mg KOH/g, preferably of $\geq 20$ mg KOH/g to $\leq 60$ mg KOH/g.

Starter compounds with Zerewitinoff-active hydrogen atoms that are used for the conventional polyether polyols usually have functionalities of 2 to 6, preferably of 3, and the starter compounds are preferably hydroxy-functional. Examples of hydroxy-functional starter compounds are propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydroquinone, pyrocatechol, resorcinol, bisphenol F, bisphenol A, 1,3,5-trihydroxybenzene, and condensation products of formaldehyde and phenol, melamine or urea which comprise methylol groups. It is preferable to use glycerol and/or trimethylolpropane as the starter compound.

Examples of suitable alkylene oxides are ethylene oxide, propylene oxide, 1,2-butylene oxide or 2,3-butylene oxide, and styrene oxide. Preferably, propylene oxide and ethylene oxide are added to the reaction mixture individually, as a mixture or successively. If the alkylene oxides are metered in successively, the products prepared comprise polyether chains with block structures. Products with ethylene oxide blocks are characterized e.g. by increased concentrations of primary end groups, imparting an advantageous isocyanate reactivity to the systems.

Component A3

Water and/or physical blowing agents are used as component A3. Examples of physical blowing agents used are carbon dioxide and/or highly volatile organic substances.

Component A4

Substances used as component A4 are auxiliary substances and additives such as a) catalysts (activators),
b) surface-active additives (surfactants) such as emulsifiers and foam stabilizers, especially those with low emissions, e.g. products of the Tegostab® LF series, and
c) additives such as reaction retarders (e.g. acid-reacting substances like hydrochloric acid or organic acid halides), cell regulators (e.g. paraffins, fatty alcohols or dimethylpolysiloxanes), pigments, dyestuffs, flame retardants (e.g. tricresyl phosphate), ageing and weathering stabilizers, plasticizers, fungistatic and bacteriostatic substances, fillers (e.g. barium sulfate, kieselguhr, black or white chalk) and release agents.

These auxiliary substances and additives that are optionally to be used concomitantly are described e.g. in EP-A 0 000 389, pages 18-21. Other examples of auxiliary substances and additives that are optionally to be used concomitantly according to the invention, and details of the mode of use and mode of action of these auxiliary substances and additives, are described in Kunststoff-Handbuch, volume VII, edited by G. Oertel, Carl-Hanser-Verlag, Munich, 3$^{rd}$ edition, 1993, e.g. on pages 104-127.

Preferred catalysts are aliphatic tertiary amines (e.g. trimethylamine, tetramethylbutanediamine), cycloaliphatic tertiary amines (e.g. 1,4-diaza(2,2,2)bicyclooctane), aliphatic amino ethers (e.g. dimethylaminoethyl ether and N,N,N-trimethyl-N-hydroxyethylbisaminoethyl ether), cycloaliphatic amino ethers (e.g. N-ethyl-morpholine), aliphatic amidines, cycloaliphatic amidines, urea, urea derivatives (e.g. aminoalkylureas; cf., for example, EP-A 0 176 013, especially (3-dimethylaminopropylamine)urea) and tin catalysts (e.g. dibutyltin oxide, dibutyltin dilaurate, tin octanoate).

Particularly preferred catalysts are

α) urea, urea derivatives and/or
β) amines and amino ethers each comprising a functional group that reacts chemically with the isocyanate. The functional group is preferably a hydroxyl group or a primary or secondary amino group. These particularly preferred catalysts have the advantage of exhibiting a greatly reduced migration and emission behaviour.

The following may be mentioned as examples of particularly preferred catalysts: (3-dimethylaminopropylamine) urea, 2-(2-dimethylaminoethoxy)ethanol, N,N-bis-(3-dimethylaminopropyl)-N-isopropanolamine, N,N,N-trimethyl-N-hydroxyethylbisaminoethyl ether and 3-dimethylaminopropylamine.

Component A5

Optionally, compounds used as component A5 have at least two isocyanate-reactive hydrogen atoms and a molecular weight of 32 to 399. These are understood as meaning compounds having hydroxyl groups and/or amino groups and/or thiol groups and/or carboxyl groups, preferably compounds having hydroxyl groups and/or amino groups, which serve as chain extenders or crosslinking agents. These compounds normally have 2 to 8, preferably 2 to 4, isocyanate-reactive hydrogen atoms. Examples of compounds which can be used as component A5 are ethanolamine, diethanolamine, triethanolamine, sorbitol and/or glycerol. Other examples of compounds of component A5 are described in EP-A 0 007 502, pages 16-17.

Component B

Suitable polyisocyanates are aliphatic, cycloaliphatic, araliphatic, aromatic and heterocyclic polyisocyanates such as those described e.g. by W. Siefken in Justus Liebigs Annalen der Chemie, 562, pages 75 to 136, for example those of formula (IX):

$$Q(NCO)_n \qquad (IX)$$

where n=2-4, preferably 2-3, and

Q is an aliphatic hydrocarbon radical having 2-18 C atoms, preferably 6-10 C atoms, a cycloaliphatic hydrocarbon radical having 4-15 C atoms, preferably 6-13 C atoms, or an araliphatic hydrocarbon radical having 8-15 C atoms, preferably 8-13 C atoms.

Examples are polyisocyanates such as those described in EP-A 0 007 502, pages 7-8. Preferred polyisocyanates are normally those which are readily available in industry, e.g. 2,4- and 2,6-toluylene diisocyanate and any desired mixtures of these isomers ("TDI"); polyphenylpolymethylene polyisocyanates such as those prepared by aniline-formaldehyde condensation followed by phosgenation ("crude MDI"); and polyisocyanates having carbodiimide groups, urethane groups, allophanate groups, isocyanurate groups, urea groups or biuret groups ("modified polyisocyanates"), especially modified polyisocyanates derived from 2,4- and/or 2,6-toluylene diisocyanate or from 4,4'- and/or 2,4'-diphenylmethane diisocyanate. Preferably, the polyisocyanate used is at least one compound selected from the group comprising 2,4- and 2,6-toluylene diisocyanate, 4,4'-, 2,4'- and 2,2'-diphenylmethane diisocyanate, and polyphenylpolymethylene polyisocyanate ("polynuclear MDI"). Particularly preferably, the polyisocyanate used is a mixture comprising 4,4'-diphenylmethane diisocyanate, 2,4'-diphenylmethane diisocyanate and polyphenylpolymethylene polyisocyanate.

To produce the flexible polyurethane foams, the reactants are reacted by the one-stage process known per se, often using mechanical devices, e.g. those described in EP-A 355 000. Details of processing devices which are also suitable for the invention are described in Kunststoff-Handbuch, volume VII, edited by Vieweg and Hochtlen, Carl-Hanser-Verlag, Munich 1993, e.g. on pages 139 to 265.

The flexible polyurethane foams can be produced as foam mouldings or foam blocks. The invention therefore provides processes for the production of flexible polyurethane foams, the flexible polyurethane foams produced by these processes, the flexible polyurethane foam blocks or flexible polyurethane foam mouldings produced by these processes, the use of the flexible polyurethane foams for the production of mouldings, and the mouldings themselves. The flexible polyurethane foams obtainable according to the invention have e.g. the following applications: furniture upholstery, textile padding, mattresses, car seats, head supports, arm rests, sponges and component parts.

The index indicates the percentage ratio of the amount of isocyanate actually used to the stoichiometric amount, i.e. the amount of isocyanate (NCO) groups calculated for conversion of the OH equivalent.

$$\text{index} = [(\text{amount of isocyanate used}):(\text{calculated amount of isocyanate})] \cdot 100 \quad (X)$$

Examples

The present invention is illustrated in greater detail with the aid of the following Examples, in which the materials and abbreviations used have the following meanings and sources of supply:

A2-1: a trifunctional polyether polyol with an OH number of 48 mg KOH/g, prepared by the DMC-catalysed alkoxylation of glycerol with a mixture of propylene oxide and ethylene oxide in proportions of 89/11, and with approx. 8 mol % of primary OH groups A4-1: Tegostab® B 2370, a preparation of organo-modified polysiloxanes from Evonik Goldschmidt A4-2: Addocat® 108, an amine catalyst from Rheinchemie A4-3: Addocat® SO, a tin catalyst from Rheinchemie TDI-1: a mixture comprising 80 wt % of 2,4-toluylene diisocyanate and 20 wt % of 2,6-toluylene diisocyanate, with an NCO content of 48.3 wt %

TDI-2: a mixture comprising 65 wt % of 2,4-toluylene diisocyanate and 35 wt % of 2,6-toluylene diisocyanate, with an NCO content of 48.3 wt %

The analyses were performed as follows:

Dynamic viscosity: MCR 51 rheometer from Anton Paar, corresponding to DIN 53019

Hydroxyl number: according to standard DIN 53240

The gross density was determined according to DIN EN ISO 3386-1-98.

The compressive strength was determined according to DIN EN ISO 3386-1-98 (at 40% deformation after $4^{th}$ cycle).

The tensile strength and elongation at break were determined according to DIN EN ISO 1798.

The proportion of $CO_2$ incorporated in the resulting polyethercarbonate polyol was determined by $^1$H-NMR (Bruker, DPX 400, 400 MHz, pulse program zg30, wait time d1: 10 sec, 64 scans). All samples were dissolved in deuterated chloroform. The relevant resonances in the $^1$H-NMR (relative to TMS=0 ppm) are as follows: cyclic carbonate (formed as a by-product) with resonance at 4.5 ppm; carbonate (resulting from carbon dioxide incorporated in the polyethercarbonate polyol) with resonances at 5.1 to 4.8 ppm; unreacted PO with resonance at 2.4 ppm; polyether polyol (i.e. without incorporated carbon dioxide) with resonances at 1.2 to 1.0 ppm; 1,8-octanediol (incorporated as starter molecule (if present)) with resonance at 1.6 to 1.52 ppm.

The molar proportion of polymer-incorporated carbonate in the reaction mixture is calculated as below according to formula (XI), using the following abbreviations:

F(4.5)=area of the resonance at 4.5 ppm for cyclic carbonate (corresponds to one H atom)

F(5.1-4.8)=area of the resonance at 5.1-4.8 ppm for polyethercarbonate polyol and one H atom for cyclic carbonate F(2.4)=area of the resonance at 2.4 ppm for free, unreacted PO F(1.2-1.0)=area of the resonance at 1.2-1.0 ppm for polyether polyol F(1.6-1.52)=area of the resonance at 1.6 to 1.52 ppm for 1,8-octanediol (starter), if present Taking the relative intensities into account, the polymer-bound carbonate ("linear carbonate" LC) in the reaction mixture was converted to mol % according to formula (XI) below:

$$LC = \frac{F(5.1-4.8) - F(4.5)}{F(5.1-4.8) + F(2.4) + 0.33*F(1.2-1.0) + 0.25*F(1.6-1.52)} * 100 \quad (XI)$$

The proportion by weight (in wt %) of polymer-bound carbonate (LC') in the reaction mixture was calculated according to formula (XII):

$$LC' = \frac{[F(5.1-4.8) - F(4.5)] * 102}{N} * 100\% \quad (XII)$$

the value of N ("denominator" N) being calculated according to formula (XIII):

$$N=[F(5.1-4.8)-F(4.5)]*102+F(4.5)*102+F(2.4)*58+0.33*F(1.2-1.0)*58+0.25*F(1.6-1.52)*146 \quad (XIII)$$

The factor 102 results from the sum of the molecular weights of $CO_2$ (molecular weight 44 g/mol) and propylene oxide (molecular weight 58 g/mol), the factor 58 results from the molecular weight of propylene oxide and the factor 146 results from the molecular weight of the 1,8-octanediol starter used (if present).

The proportion by weight (in wt %) of cyclic carbonate (CC') in the reaction mixture was calculated according to formula (XIV):

$$CC' = \frac{F(4.5)*102}{N} * 100\% \quad (XIV)$$

the value of N being calculated according to formula (XIII).

To calculate the composition based on the polymer component (consisting of polyether polyol, synthesized from starter and propylene oxide during the activation steps taking place under $CO_2$-free conditions, and polyethercarbonate polyol, synthesized from starter, propylene oxide and carbon dioxide during the activation steps taking place in the presence of $CO_2$ and during copolymerization) from the values of the composition of the reaction mixture, the non-polymer constituents of the reaction mixture (i.e. cyclic propylene carbonate and any unreacted propylene oxide present) were arithmetically eliminated. The proportion by weight of carbonate repeating units in the polyethercarbonate polyol was converted to a proportion by weight of carbon dioxide by means of the factor F=44/(44+58). The data for the $CO_2$ content of the polyethercarbonate polyol are normalized to the proportion of the polyethercarbonate polyol molecule formed during the copolymerization and optionally the activation steps in the presence of $CO_2$ (i.e. the proportion of the polyethercarbonate polyol molecule resulting from the starter (1,8-octanediol, if present) and from the reaction of the starter with epoxide, added under $CO_2$-free conditions, was not taken into account here).

Determination of the molar proportion of primary OH groups: by $^1$H-NMR (Bruker DPX 400, deuterochloroform):

To determine the content of primary OH groups, the polyethercarbonate samples were first peracetylated.

The following peracetylation mixture was prepared for this purpose:
9.4 g of acetic anhydride p.a.
1.6 g of acetic acid p.a.
100 ml of pyridine p.a.

For the peracetylation reaction 10 g of polyethercarbonate polyol were weighed into a 300 ml ground-glass Erlenmeyer flask. The volume of peracetylation mixture depended on the OH number of the polyethercarbonate to be peracetylated, the OH number of the polyethercarbonate polyol being rounded to the nearest tens digit (based in each case on 10 g of polyethercarbonate polyol); 10 ml of peracetylation mixture are then added per 10 mg KOH/g. Accordingly, for example, 50 ml of peracetylation mixture were added to the 10 g sample of polyethercarbonate polyol with an OH number of 45.1 mg KOH/g.

After the addition of glass boiling beads, the ground-glass Erlenmeyer flask was provided with a riser tube (air condenser) and the sample was boiled for 75 min under gentle reflux. The sample mixture was then transferred to a 500 ml round-bottom flask and volatile constituents (essentially pyridine, acetic acid and excess acetic anhydride) were distilled off over a period of 30 min at 80° C. and 10 mbar (absolute). The distillation residue was then treated with 3×100 ml of cyclohexane (toluene was used as an alternative in cases where the distillation residue did not dissolve in cyclohexane) and volatile constituents were removed for 15 min at 80° C. and 400 mbar (absolute). Volatile constituents were then removed from the sample for one hour at 100° C. and 10 mbar (absolute).

To determine the molar proportions of primary and secondary OH end groups in the polyethercarbonate polyol, the sample prepared as above was dissolved in deuterated chloroform and analysed by $^1$H-NMR (Bruker, DPX 400, 400 MHz, pulse program zg30, wait time d1: 10 sec, 64 scans). The relevant resonances in the $^1$H-NMR (relative to TMS=0 ppm) are as follows:
methyl signal of a peracetylated secondary OH end group: 2.04 ppm
methyl signal of a peracetylated primary OH end group: 2.07 ppm The molar proportion of secondary and primary OH end groups is then worked out as follows:

proportion of secondary OH end groups(CH—OH)=
$F(2.04)/(F(2.04)+F(2.07))*100\%$ (XV)

proportion of primary OH end groups($CH_2$—OH)=$F(2.07)/(F(2.04)+F(2.07))*100\%$ (XVI)

In formulae (XV) and (XVI) F represents the area of the resonance at 2.04 ppm or 2.07 ppm.

I. Preparation of Polyethercarbonate Polyol A1-1 by Copolymerization of PO and $CO_2$ 140 mg of DMC catalyst (prepared according to Example 6 of WO-A 01/80994) and 160 g of an anhydrous trifunctional poly(oxypropylene) polyol with an OH number of 235 mg KOH/g were placed as H-functional starter substances in a 1 litre pressurized reactor fitted with a with gas metering device. The reactor was heated to 130° C. and rendered inert by the repeated application of nitrogen to approx. 5 bar and subsequent pressure release to approx. 1 bar. This process was carried out 3 times. 25 g of propylene oxide (PO) were rapidly metered into the reactor at 130° C. and in the absence of $CO_2$. The start of the reaction was signalled by a hotspot and by a pressure drop to roughly the initial value (approx. 1 bar). After the first pressure drop 20 g of PO and then 19 g of PO were rapidly metered in, each time causing a further hotspot and pressure drop. After 50 bar of $CO_2$ had been applied to the reactor, 50 g of PO were rapidly metered in, causing a hotspot after a further wait time. The carbon dioxide ($CO_2$) pressure started to drop at the same time. The pressure was regulated in such a way that fresh $CO_2$ was added when the pressure dropped below the set value. Only then was the remaining propylene oxide (387 g) pumped continuously into the reactor at approx. 1.8 g/min; after 10 minutes the temperature was lowered to 105° C. in steps of 5° C. every five minutes. When the addition of PO was complete, stirring (1500 rpm) was continued for a further 60 minutes at 105° C. and the pressure indicated above. Finally, highly volatile constituents were separated from the product by film evaporation.

Analysis of the resulting polyethercarbonate polyol A1-1:
Hydroxyl number: 54.9 mg KOH/g
Dynamic viscosity: 4115 mPas (25° C.)
Content of incorporated $CO_2$: 12.8 wt %

II. Preparation of Polyethercarbonate Polyols with Terminal Alkylene Oxide Block Preparation of Polyethercarbonate Polyol A1-2 (PO/EO=100/0 [mol/mol]) (Comparison)

403 g of polyethercarbonate polyol A1-1 were placed in a 2 l laboratory autoclave under a nitrogen atmosphere, heated to 130° C. and then stripped with nitrogen at this temperature for 30 minutes at a pressure of 0.1 bar (absolute). 68.8 g (1.184 mol) of PO were then metered into the reactor at 130° C. over a period of 5 minutes, with stirring. After a post-reaction time of 90 minutes, highly volatile constituents were removed by heating at 90° C. for 30 minutes under vacuum and the reaction mixture was then cooled to room temperature.

Analysis of the Resulting Polyethercarbonate Polyol A1-2:
Hydroxyl number: 47.3 mg KOH/g
Dynamic viscosity: 3130 mPas (25° C.)
Content of primary OH groups: 8 mol %

Preparation of Polyethercarbonate Polyol A1-3 (PO/EO=70/30 [mol/mol]) (Comparison)

385 g of polyethercarbonate polyol A1-1 were placed in a 2 l laboratory autoclave under a nitrogen atmosphere, heated to 130° C. and then stripped with nitrogen at this temperature for 30 minutes at a pressure of 0.1 bar (absolute). A mixture of 46.1 g (0.793 mol) of PO and 15.0 g (0.340 mol) of EO was then metered into the reactor at 130° C. over a period of 5 minutes, with stirring. After a post-reaction time of 90 minutes, highly volatile constituents were removed by heating at 90° C. for 30 minutes under vacuum and the reaction mixture was then cooled to room temperature.

Analysis of the Resulting Polyethercarbonate Polyol A1-3:
Hydroxyl number: 45.1 mg KOH/g
Dynamic viscosity: 3735 mPas (25° C.)
Content of primary OH groups: 21 mol %

Preparation of Polyethercarbonate Polyol A1-4 (PO/EO=50/50 [mol/mol])

310 g of polyethercarbonate polyol A1-1 were placed in a 2 l laboratory autoclave under a nitrogen atmosphere, heated to 130° C. and then stripped with nitrogen at this temperature for 30 minutes at a pressure of 0.1 bar (absolute). A mixture of 26.4 g (0.454 mol) of PO and 20.1 g (0.456 mol) of EO was then metered into the reactor at 130° C. over a period of 5 minutes, with stirring. After a post-reaction time of 90 minutes, highly volatile constituents were removed by heating at 90° C. for 30 minutes under vacuum and the reaction mixture was then cooled to room temperature.

Analysis of the Resulting Polyethercarbonate Polyol A1-4:
Hydroxyl number: 44.7 mg KOH/g
Dynamic viscosity: 4380 mPas (25° C.)
Content of primary OH groups: 29 mol %

Preparation of Polyethercarbonate Polyol A1-5 (PO/EO=30/70 [mol/mol])

401 g of polyethercarbonate polyol A1-1 were placed in a 2 l laboratory autoclave under a nitrogen atmosphere, heated to 130° C. and then stripped with nitrogen at this temperature for 30 minutes at a pressure of 0.1 bar (absolute). A mixture of 22.5 g (0.387 mol) of PO and 39.8 g (0.902 mol) of EO was then metered into the reactor at 130° C. over a period of 5 minutes, with stirring. After a post-reaction time of 90 minutes, highly volatile constituents were removed by heating at 90° C. for 30 minutes under vacuum and the reaction mixture was then cooled to room temperature.

Analysis of the Resulting Polyethercarbonate Polyol A1-5:
Hydroxyl number: 47.5 mg KOH/g
Dynamic viscosity: not determinable at 25° C. as A1-5 is a solid
Content of primary OH groups: 37 mol %

Preparation of Polyethercarbonate Polyol A1-6 (PO/EO=0/100 [mol/mol]) (Comparison)

401 g of polyethercarbonate polyol A1-1 were placed in a 2 l laboratory autoclave under a nitrogen atmosphere, heated to 130° C. and then stripped with nitrogen at this temperature for 30 minutes at a pressure of 0.1 bar (absolute). 56.8 g (1.288 mol) of EO were then metered into the reactor at 130° C. over a period of 5 minutes, with stirring. After a post-reaction time of 90 minutes, highly volatile constituents were removed by heating at 90° C. for 30 minutes under vacuum and the reaction mixture was then cooled to room temperature.

Analysis of the Resulting Polyethercarbonate Polyol A1-6:
Hydroxyl number: 47.3 mg KOH/g
Dynamic viscosity: not determinable at 25° C. as A1-6 is a solid
Content of primary OH groups: 53 mol %

III. Production of Flexible Polyurethane Foam Blocks

The starting materials listed in the Examples in Table 1 below were reacted together according to the processing method conventionally used for the production of polyurethane foams by the one-stage process.

Surprisingly, the flexible polyurethane foam blocks according to the invention (Examples 4 to 6), in which polyethercarbonate polyols with a terminal mixed block of propylene oxide (PO) and ethylene oxide (EO) in a molar ratio PO/EO of 15/85 to 60/40 were processed, exhibited a higher compressive strength and a higher tensile strength than flexible foam blocks based on a polyether polyol (A2-1; cf. Table 1, Comparative Example 1) or on a polyethercarbonate polyol with a terminal propylene oxide block (A1-2; cf. Table 1, Comparative Example 2). Advantageous properties in respect of compressive strength were achieved with polyethercarbonate polyols with a terminal mixed block having a ratio PO/EO of 50/50 or 30/70 (A1-4 or A1-5; cf. Table 1, Examples 4, 5 and 6). Particularly advantageous properties in respect of compressive strength and tensile strength were achieved with a polyethercarbonate polyol with a terminal mixed block having a ratio PO/EO of 30/70 (A1-5; cf. Table 1, Examples 5 and 6).

TABLE 1

Production and properties of the flexible polyurethane foam blocks

| | | 1 (Comp.) | 2 (Comp.) | 3 (Comp.) | 4 | 5 | 6 | 7 (Comp.) |
|---|---|---|---|---|---|---|---|---|
| Component A | | | | | | | | |
| A2-1 | [pbw] | 94.95 | | | | | | |
| A1-2 | [pbw] | | 94.95 | | | | | |
| A1-3 | [pbw] | | | 94.95 | | | | |
| A1-4 | [pbw] | | | | 94.98 | | | |
| A1-5 | [pbw] | | | | | 94.97 | 94.97 | |
| A1-6 | [pbw] | | | | | | | 94.97 |
| Water | [pbw] | 3.80 | 3.80 | 3.80 | 3.80 | 3.80 | 3.80 | 3.80 |
| A4-1 | [pbw] | 0.95 | 0.95 | 0.95 | 0.95 | 0.95 | 0.95 | 0.95 |
| A4-2 | [pbw] | 0.11 | 0.11 | 0.11 | 0.11 | 0.11 | 0.11 | 0.11 |
| A4-3 | [pbw] | 0.19 | 0.19 | 0.19 | 0.15 | 0.17 | 0.17 | 0.17 |
| Component B | | | | | | | | |
| TDI-1 | [pbw] | 100 | 100 | 90 | 100 | 100 | 80 | 100 |
| TDI-2 | [pbw] | | | 10 | | | 20 | |
| WR (A:B) | 100: | 47.27 | 47.27 | 47.27 | 47.27 | 47.27 | 47.27 | 47.27 |
| Index | | 108 | 108 | 108 | 108 | 108 | 108 | 108 |
| Gross density | [kg/m$^3$] | 27.5 | 28.9 | 31.5 | 30.5 | 27.9 | 27.9 | 24.2 |
| Compressive strength | [kPa] | 4.8 | 5.7 | 6.4 | 6.8 | 7.6 | 7.3 | 5.5 |
| Tensile strength | [kPa] | 85 | 79 | 104 | 99 | 107 | 113 | 96 |
| Elongation at break | [%] | 123 | 103 | 114 | 97 | 96 | 110 | 104 |

Abbreviations:
Comp. = Comparative Example;
pbw = parts by weight;
WR (A:B) = weight ratio of component A to component B at the indicated index, based on 100 parts by weight of component A

The invention claimed is:
1. A process for the preparation of a polyethercarbonate polyol, comprising
   (i) preparing, in a first step, a polyethercarbonate polyol chain from one or more H-functional starter substances, one or more alkylene oxides and carbon dioxide in the presence of at least one DMC catalyst, in a reactor, and
   (ii) extending, in a second step, the polyethercarbonate polyol chain with a mixture of at least two different alkylene oxides in the presence of at least one DMC catalyst,
   and in that the mixture of at least two different alkylene oxides in the second step (ii) is a mixture comprising propylene oxide (PO) and ethylene oxide (EO) in a molar ratio PO/EO of 15/85 to 30/70; wherein the mean length of mixed blocks of at least two different alkylene oxides in the resultant polyethercarbonate polyol in step (ii) is 2.0 to 20.0 alkylene oxide units; based on one hydroxy group of the polyether carbonate polyol.
2. The process according to claim 1, wherein, in the first step (i),
   ($\alpha$) said one or more H-functional starter substances or a mixture of at least two H-functional starter substances are provided and optionally water and/or other highly volatile compounds are removed by raising the temperature and/or reducing the pressure ("drying") in said reactor, said at least one DMC catalyst being added to said one or more H-functional starter substances or the mixture of at least two H-functional starter substances before or after drying when drying occurs,
   ($\beta$) a first portion of one or more alkylene oxides and optionally $CO_2$ is added to the mixture resulting from step ($\alpha$), wherein a hotspot occurs due to the subsequent exothermic chemical reaction and/or a pressure drop in said reactor, and said hot spot and/or pressure drop are allowed to subside, and optionally, the activation step ($\beta$) is carried out several times, and
   ($\gamma$) one or more additional alkylene oxides and carbon dioxide are added to the mixture resulting from step ($\beta$), wherein said one or more additional alkylene oxides in step ($\gamma$) is identical or different from said one or more alkylene oxides used in step ($\beta$).
3. The process according to claim 1, further comprising
   (iii) extending with an alkylene oxide the polyethercarbonate polyol, which comprises a terminal mixed oxyalkylene block, and was prepared in step (ii).
4. A process for the production of a flexible polyurethane foam comprising preparing a polyethercarbonate polyol according to the process of claim 1 and then reacting a polyol component comprising the polyethercarbonate polyol with a polyisocyanate.
5. A process for the production of a flexible polyurethane foam with a gross density according to DIN EN ISO 3386-1-98 in the range from ≥10 kg/m3 to ≤150 kg/m3 and a compressive strength according to DIN EN ISO 3386-1-98 in the range from ≥0.5 kPa to ≤20 kPa, at 40% deformation after 4th cycle, comprising preparing a polyethercarbonate polyol according to the process of claim 1 and then reacting a component A comprising
   A1 100 to 10 parts by weight, based on the sum of the parts by weight of components A1 and A2, of the polyethercarbonate polyol,
   A2 0 to 90 parts by weight, based on the sum of the parts by weight of components A1 and A2, of an additional polyether polyol,
   A3 0.5 to 25 parts by weight, based on the sum of the parts by weight of components A1 and A2, of water and/or physical blowing agents,
   A4 0.05 to 10 parts by weight, based on the sum of the parts by weight of components A1 and A2, of an auxiliary substance and/or an additive, and
   A5 0 to 10 parts by weight, based on the sum of the parts by weight of components A1 and A2, of compounds having isocyanate-reactive hydrogen atoms with a molecular weight of 62-399,
   a component B comprising a polyisocyanate,
   said reacting taking place at an index of 50 to 250, and all the parts by weight of components A1 to A5 being scaled so that the sum of the parts by weight of components A1+A2 in the composition is 100.
6. The process according to claim 5 wherein component A consists of
   A1 100 parts by weight of the polyethercarbonate polyol,
   A2 0 parts by weight of an additional polyether polyol,
   A3 0.5 to 25 parts by weight, based on the parts by weight component A1, of water and/or physical blowing agents,
   A4 0.05 to 10 parts weight, based on the parts by weight component A1 of an auxiliary substances and/or an additive, and
   A5 0 to 10 parts by weight, based on the parts by weight component A1 of compounds having isocyanate-reactive hydrogen atoms with a molecular weight of 62-399.
7. A flexible polyurethane foam with a gross density according to DIN EN ISO 3386-1-98 in the range from ≥10 kg/m$^3$ to ≤150 kg/m$^3$ and a compressive strength according to DIN EN ISO 3386-1-98 in the range from ≥0.5 kPa to ≤20 kPa, at 40% deformation after 4$^{th}$ cycle, obtained by the process according to claim 5.
8. A process for the preparation of a polyethercarbonate polyol, comprising
   (i) preparing, in a first step, a polyethercarbonate polyol chain from one or more H-functional starter substances, one or more alkylene oxides and carbon dioxide in the presence of at least one DMC catalyst, in a reactor, and
   (ii) extending, in a second step, the polyethercarbonate polyol chain with a mixture of at least two different alkylene oxides in the presence of at least one DMC catalyst,
   and in that the mixture of at least two different alkylene oxides in the second step (ii) is a mixture comprising propylene oxide (PO) and ethylene oxide (EO) in a molar ratio PO/EO of 15/85 to 30/70; wherein the polyethercarbonate polyol obtained in the second step has a hydroxyl number of 20 to 80 mg KOH/g.
9. The process according to claim 8, wherein, in the first step (i),
   ($\alpha$) said one or more H-functional starter substances or a mixture of at least two H-functional starter substances are provided and optionally water and/or other highly volatile compounds are removed by raising the temperature and/or reducing the pressure ("drying") in said reactor, said at least one DMC catalyst being added to said one or more H-functional starter substances or the mixture of at least two H-functional starter substances before or after drying when drying occurs,
   ($\beta$) a first portion of one or more alkylene oxides and optionally $CO_2$ is added to the mixture resulting from step ($\alpha$), wherein a hotspot occurs due to the subsequent exothermic chemical reaction and/or a pressure drop in said reactor, and said hot spot and/or pressure drop are allowed to subside, and optionally, the activation step (β) is carried out several times, and (γ) one or more additional alkylene oxides and carbon dioxide are added to the mixture resulting from step (β), wherein said one or more additional alkylene oxides in step (γ) is identical or different from said one or more alkylene oxides used in step (β).

10. The process according to claim 8, further comprising (iii) extending with an alkylene oxide the polyethercarbonate polyol, which comprises a terminal mixed oxyalkylene block, and was prepared in step (ii).

11. The process for the production of a flexible polyurethane foam comprising preparing a polyethercarbonate polyol according to the process of claim 8 and then reacting a polyol component comprising the polyethercarbonate polyol with a polyisocyanate.

12. A flexible polyurethane foam with a gross density according to DIN EN ISO 3386-1-98 in the range from ≥10 kg/m$^3$ to ≤150 kg/m$^3$ and a compressive strength according to DIN EN ISO 3386-1-98 in the range from ≥0.5 kPa to ≤20 kPa, at 40% deformation after 4$^{th}$ cycle, obtained by the process according to claim 11.

\* \* \* \* \*